(12) United States Patent
Nikic

(10) Patent No.: US 9,771,146 B2
(45) Date of Patent: Sep. 26, 2017

(54) EMBEDDED DIELECTRIC STRUCTURES FOR ACTIVE FLOW CONTROL PLASMA SOURCES

(71) Applicant: The Boeing Company, Chicago, IL (US)

(72) Inventor: Dejan Nikic, Seattle, WA (US)

(73) Assignee: The Boeing Company, Chicago, IL (US)

( * ) Notice: Subject to any disclaimer, the term of this patent is extended or adjusted under 35 U.S.C. 154(b) by 42 days.

(21) Appl. No.: 14/864,796

(22) Filed: Sep. 24, 2015

(65) Prior Publication Data

US 2017/0088255 A1 Mar. 30, 2017

(51) Int. Cl.
*B64C 23/00* (2006.01)
*B64F 5/40* (2017.01)

(52) U.S. Cl.
CPC .............. *B64C 23/005* (2013.01); *B64F 5/40* (2017.01); *B64C 2211/00* (2013.01); *B64C 2230/12* (2013.01)

(58) Field of Classification Search
CPC .......................... B64C 23/005; B64C 2230/12
See application file for complete search history.

(56) References Cited

U.S. PATENT DOCUMENTS

| 3,095,163 | A | * | 6/1963 | Hill | ........................ | B64C 23/005 |
| | | | | | | 244/12.1 |
| 6,685,803 | B2 | * | 2/2004 | Lazarovich | .......... | B01D 53/326 |
| | | | | | | 204/164 |
| 7,744,039 | B2 | * | 6/2010 | Miles | ..................... | B64C 23/005 |
| | | | | | | 244/205 |
| 8,016,247 | B2 | * | 9/2011 | Schwimley | ........... | B64C 23/005 |
| | | | | | | 244/200 |
| 8,308,112 | B2 | * | 11/2012 | Wood | ..................... | B64C 23/005 |
| | | | | | | 244/203 |
| 8,937,799 | B2 | * | 1/2015 | Tanaka | ....................... | F01D 5/14 |
| | | | | | | 361/225 |
| 2007/0089795 | A1 | | 4/2007 | Jacob | | |
| 2008/0023589 | A1 | * | 1/2008 | Miles | ..................... | B64C 23/005 |
| | | | | | | 244/205 |
| 2008/0122252 | A1 | * | 5/2008 | Corke | .................... | B62D 35/00 |
| | | | | | | 296/180.2 |
| 2009/0173837 | A1 | * | 7/2009 | Silkey | ................... | B64C 23/005 |
| | | | | | | 244/205 |

(Continued)

FOREIGN PATENT DOCUMENTS

EP 2884823 A1 6/2015

OTHER PUBLICATIONS

Dmitriy M. Orlov, B.S., M.S.A.E, Modelling and Simulation of Single Dielectric Barrier Discharge Plasma Actuators, A Dissertation Submitted to the Graduate School of the University of Notre Dame, Oct. 2006, 205 pages.

(Continued)

*Primary Examiner* — Joseph W Sanderson
(74) *Attorney, Agent, or Firm* — Kolisch Hartwell, P.C.

(57) ABSTRACT

An aircraft active flow control dielectric barrier discharge (DBD) device may include a machinable ceramic dielectric support having an aerodynamic surface shaped to form an exposed flush part of an airfoil surface on an aircraft. The DBD device may include at least two electrodes configured to be oppositely charged and spaced apart from each other on the dielectric support.

17 Claims, 6 Drawing Sheets

(56) References Cited

U.S. PATENT DOCUMENTS

| 2010/0127624 A1* | 5/2010 | Roy .................... B64C 23/005 |
| | | 315/111.21 |
| 2010/0133386 A1 | 6/2010 | Schwimley et al. |
| 2010/0224733 A1* | 9/2010 | Wood .................. B64C 23/005 |
| | | 244/205 |
| 2011/0198312 A1* | 8/2011 | Tanaka .................. H05K 13/00 |
| | | 216/13 |
| 2011/0253842 A1 | 10/2011 | Silkey et al. |
| 2012/0287550 A1* | 11/2012 | Tanaka ..................... F01D 5/14 |
| | | 361/225 |
| 2015/0239552 A1 | 8/2015 | Nikic |
| 2015/0267727 A1* | 9/2015 | Segawa ................ F04D 29/681 |
| | | 313/231.31 |

OTHER PUBLICATIONS

Alexey V. Kozlov, Plasma Actuators for Bluff Body Flow Control, A Dissertation Submitted to the Graduate School of University of Notre Dame, Jul. 2010, 206 pages.

Choi Kwing-So, et al., Plasma Virtual Actuators for Flow Control, Journal of Flow Control, Measurement & Visualization, published Jan. 15, 2015 by Scientific Research Publishing, pp. 22-34.

European Patent Office, Extended European Search Report in European Patent Application No. 16175813.1-1754, dated Feb. 28, 2017, 9 pages.

* cited by examiner

EMBEDDED DIELECTRIC STRUCTURES FOR ACTIVE FLOW CONTROL PLASMA SOURCES

FIELD

The present application relates generally to improving flow control across aerodynamic surface of an aircraft. More specifically, the disclosed embodiments relate to systems and methods for creating a plasma proximate an aerodynamic surface via an embedded dielectric structure.

BACKGROUND

Performance of an aerodynamic structure on an aircraft is determined by the interaction of the structures with the surrounding air as the aircraft flies. These interactions can lead to laminar flow of the passing air, turbulent flow, or a combination of the two. The interactions may also be responsible for lift forces required for flight and drag forces.

Aerodynamic surfaces of aircraft are designed to manipulate and/or control the interactions of the surfaces with the surrounding air. For example, the shape of an airplane wing is designed to make the speed of airflow above the wing different from the speed of airflow below the wing, thereby creating lift. Some aerodynamic surfaces can change their shape during flight by extending flaps, activating ailerons, moving rudders, or other such mechanical devices, thereby altering the interaction of the surface with the passing air.

A non-mechanical method of altering airflow over an aerodynamic surface of an aircraft involves use of active flow control plasma sources, for example dielectric barrier discharge (DBD) devices, to create a layer of plasma proximate the aerodynamic surface as the aircraft flies. The layer of plasma typically has a lower pressure than the layer of passing air adjacent the plasma. This lower pressure may draw the passing air towards the aerodynamic surface more strongly than if the DBD device were omitted.

The utility of DBD devices has been shown in laboratory settings. However, the materials used in the laboratory do not lend themselves to implementation on an aircraft. For example, many DBD devices are constructed from various layers of flexible tape applied sequentially to an existing aerodynamic surface of a laboratory model. These tape structures have three drawbacks. First, they are not robust and may break down prematurely in the presence of the plasma they create. Second, they are not scalable and would be difficult to apply to a full-size aircraft. Third, applying additional structure to an existing aircraft may adversely affect the aerodynamic properties of the aircraft.

SUMMARY

An aircraft active flow control dielectric barrier discharge (DBD) device may include a machinable ceramic dielectric support having an aerodynamic surface shaped to form an exposed flush part of an airfoil surface on an aircraft. The DBD device may include at least two electrodes configured to be oppositely charged and spaced apart from each other on the dielectric support.

Another DBD device may include a rigid dielectric housing having an exterior aerodynamic surface shaped to form a portion of an airfoil structure on an aircraft. The DBD device may include an exposed electrode joined to the exterior aerodynamic surface of the housing and a buried electrode covered by the housing and spaced from the exposed electrode. The DBD device may include a conductive interface structure configured to electrically connect the electrodes to a voltage source configured to apply a potential difference across the exposed electrode and the buried electrode.

A method to improve aerodynamic properties of an aerodynamic surface may include connecting a rigid DBD device to an airfoil structure. The DBD device may include a rigid dielectric carrier lying flush with an aerodynamic surface of the airfoil structure. The method may further include controlling air flow adjacent the aerodynamic surface of the airfoil structure by applying an alternating potential difference across an exposed electrode and a buried electrode. Applying the potential difference may thereby create a plasma proximate an upper surface of the DBD device.

The present disclosure provides various apparatuses and methods of use thereof. In some embodiments, an apparatus may include a rigid dielectric disposed within a recess in an aerodynamic structure and a pair of electrodes disposed on opposite sides of the rigid dielectric. In some embodiments, a method may include connecting a rigid DBD device to an aerodynamic surface so that the dielectric lies flush with the aerodynamic surface.

Features, functions, and advantages may be achieved independently in various embodiments of the present disclosure, or may be combined in yet other embodiments, further details of which can be seen with reference to the following description and drawings.

DESCRIPTION

Overview

Various embodiments of a dielectric barrier discharge (DBD) device having a rigid structure and configured to be embedded within an aerodynamic structure are described below and illustrated in the associated drawings. Unless otherwise specified, the DBD device and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other active flow control plasma sources. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

EXAMPLES, COMPONENTS, AND ALTERNATIVES

The following sections describe selected aspects of exemplary DBD devices as well as related systems and/or methods. The examples in these sections are intended for illustration and should not be interpreted as limiting the entire scope of the present disclosure. Each section may include one or more distinct inventions, and/or contextual or related information, function, and/or structure.

Example 1

Figure 1:
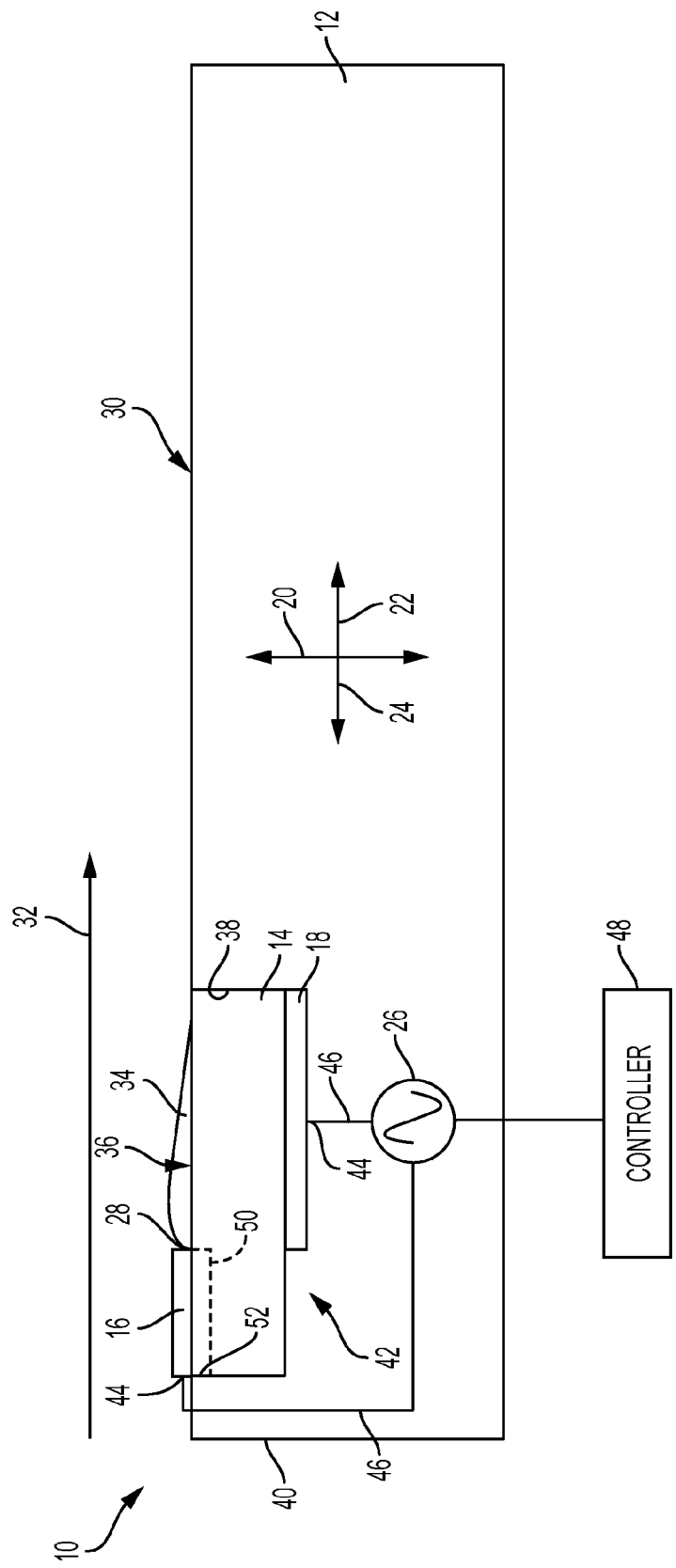
FIG. 1 is a schematic sectional view of a dielectric barrier discharge (DBD) device embedded in an aerodynamic structure.

This example describes an illustrative DBD device, as shown in FIG. 1.

FIG. 1 is a schematic sectional view of a DBD device, generally indicated at 10, embedded in an aerodynamic or airfoil structure 12. Aerodynamic structure 12 may be a three-dimensional structure and may extend in a direction perpendicular to the plane of FIG. 1. Examples of aerodynamic structures include, but are not limited to, wings of aircraft, helicopter blades or rotor blades, or other control surfaces such as flaps, slats, ailerons, spoilers, winglets, landing gear supports or others. DBD device 10 may include a dielectric 14, an exposed electrode 16, and a buried electrode 18.

Dielectric 14 may be any material having the appropriate electrical and mechanical properties for this use. Dielectric 14 may be made of a machinable ceramic material, for example, Macor™ machinable glass-ceramic and similar types of machinable ceramic material(s) and/or alumina and similar types of fine grained, polycrystalline microstructure machinable ceramics. Machinable ceramics may have the advantage that they can be machined to generate any shape with relative ease. Dielectric 14 may act as a support for the exposed electrode and the buried electrode. Machinable ceramics may also have a dielectric strength similar to the flexible tape structures used in laboratory experiments on DBD devices.

Exposed electrode 16 may be any appropriate electrode or metallic material. Exposed electrode 16 may be a part having a degree of rigidity before it is affixed to DBD device 10, such as a thin strip of metal. Alternately, the exposed electrode may be plasma sprayed, plated, or otherwise deposited directly onto dielectric 14. Such deposition techniques may result in a thinner exposed electrode which may be advantageous aerodynamically. Plasma spraying may be appropriate in cases where dielectric 14 is a machinable ceramic, as ceramics can tolerate the high heat generated during such a deposition technique. Exposed dielectric 16 may be a refractory metal such as Molybdenum or Tungsten or a more conventional metal such as copper, among others.

Buried electrode 18 may be any appropriate electrode or metallic material. Since buried electrode 18 may be buried beneath dielectric 14 within the aerodynamic structure 12, buried electrode 18 may not interact with air passing over the aerodynamic structure. Thus, there may be fewer constraints on the thickness of the buried electrode and the materials used. Buried electrode 18 may be a part having a degree of rigidity before it is affixed to DBD device 10, such as a thin strip of metal. Alternately, the buried electrode may be deposited onto dielectric 14.

In yet another alternative, buried electrode 18 may not be considered to be a component of the DBD device and instead may be attached to aerodynamic structure 12. In this case, the buried electrode may make contact with dielectric 14 once the DBD device is installed in the aerodynamic structure.

As stated above, the exposed electrode 16 and the buried electrode 18 may be operatively coupled to dielectric 14. The two electrodes may be configured to be disposed on opposite sides of the dielectric. In this manner, DBD device 10 may be similar to a capacitor in that it may have two conductors disposed on opposite sides of an insulator or dielectric. Dielectric 14 may be considered a housing that carries the two electrodes.

As in a standard capacitor, the two electrodes may be spaced from each other in a vertical direction 20. The vertical distance between the two electrodes may be in a range of 1-5 mm, depending on the properties of the dielectric and a voltage applied. This vertical spacing may be the same as the thickness of dielectric 14 in the vertical direction 20. Alternately, if one or both of the electrodes are disposed within dielectric 14, then the thickness of the dielectric may be greater than the vertical spacing between the two electrodes.

In contrast to a standard capacitor, the two electrodes may be spaced from each other in a horizontal direction. In relation to the aerodynamic structure 12, the buried electrode 18 may be spaced in a downwind or downstream direction 22 from the exposed electrode 16. Conversely, the exposed electrode 16 may be spaced in an upwind or upstream direction 24 from the buried electrode 18. The exposed electrode and the buried electrode may overlap one another as viewed from above, or their edges may align in the vertical direction.

The two electrodes 16 and 18 may have a thickness in the vertical direction in a range of approximately 0.1 to 1.0 mm, though other ranges area also possible. In the horizontal direction, for example 22 or 24, the exposed electrode may have a width of approximately 5 mm, though other widths are also possible. The buried electrode may be four to five times wider than the exposed electrode, though other widths are also possible.

DBD device 10 may be operatively coupled to a voltage source 26. The voltage source 26 may also be considered to be a power source for DBD device 10. Voltage source 26 may be configured to apply a potential difference across the exposed electrode and the buried electrode. The applied potential difference may be a direct current (DC) voltage, a pulsed DC voltage, or an alternating current (AC) voltage. That is, the relative polarity of the two electrodes may be fixed or alternating. If the applied voltage is not constant, it need not be strictly alternating in a sinusoidal pattern. Non-constant voltages that have a sawtooth, triangular, or pulsed shape are also possible, among many others. Applying a potential difference across the two electrodes will produce an electric field between and around the two electrodes.

A standard capacitor produces a substantially uniform electric field in the region between the two conductors and a minimal "fringing" electric field outside that region. In contrast, DBD device 10 may produce a non-uniform electric field in the region between the two conductors and a substantial fringing field outside of that region due to the horizontal spacing between the two electrodes. As electric fields tend to be strongest proximate sharp edges of conductors, the electric field may be strongest proximate a downstream edge 28 of the exposed electrode.

As the airfoil structure 12 moves through the surrounding air, air may flow over a surface 30 of the airfoil, the direction of airflow indicated by arrow 32. As this air passes though the strong electric field proximate the downstream edge 28 of the exposed electrode 16, a portion of the passing air may be ionized and form a plasma 34. Plasma 34 may be localized proximate an exterior surface 36 of dielectric 14 and over buried electrode 18. Ceramic materials may have an advantage in being more able to withstand the presence of plasma 34 without deteriorating than other dielectric structures.

Plasma 34 may have an effect on the air passing over the aerodynamic structure 12. Plasma 34 may represent a region of lower air pressure than the non-ionized air passing over airfoil 12. This may result in an upward force in direction 20 on the airfoil. That is, the presence of plasma 34 on an upper surface of the airfoil may result in an additional lift force applied to the airfoil. Alternately, if the passing air is about to separate from the surface 30 of airfoil 12 and create an aerodynamic stall, the lower pressure region of plasma 34 may apply a downward force to the passing air, thereby preventing or delaying the stall. This may allow airfoil 12 to move through the passing air at a greater angle of attack before inducing a stall.

DBD device 10 may be disposed within a recess 38 in aerodynamic structure 12. The recess may be sized to receive the DBD device so that the exterior surface 36 of dielectric 14 forms an exposed flush part of the surface 30 of the airfoil. That is, the exterior surface of the dielectric may form a smooth continuation of the surface of the airfoil. If the exterior surface of the airfoil is generally flat, then the exterior surface of the dielectric may be flat as well, substantially continuing the plane of the surface of the airfoil. If the surface of the airfoil is curved, the surface of the dielectric may be curved as well, so that the exterior surfaces of the dielectric and the airfoil together form one continuous aerodynamic surface.

DBD device 10 disposed within recess 38 may be disposed proximate a leading edge 40 of the aerodynamic structure 12. The leading edge of the airfoil may be a portion of the airfoil disposed the farthest in the upwind direction 24. DBD device 10 may be disposed at other locations in airfoil 12 if active airflow control is desired at other locations.

DBD device 10 may include a conductive interface structure 42 configured to electrically connect the electrodes to voltage source 26. The conductive interface structure may be any appropriate structure configured to mate with a corresponding structure on the airfoil so as to establish electrical connection between the voltage source 26 and the electrodes 16 and 18. For example, conductive interface structure 42 may include one or more plug structures 44 configured for connection to the voltage source 26. Connecting wires 46 may be included in airfoil 12 configured to connect the DBD device to the voltage or power source.

DBD device 10 may include a controller 48. Controller 48 may be programmed to alter the power supplied from the voltage source to the electrodes. Controller 48 may alter the amount of power supplied, as well as the various characteristics of the potential difference applied across the electrodes, such as the amplitude, frequency, and waveform of the applied voltage. Controller 48 may operate at the direction of a user, such as a pilot, or autonomously. For example, controller 48 may be programmed to activate DBD device 10 during takeoff, landing, if a predetermined speed threshold is crossed, if a predetermined angle of attack for the airfoil is exceeded, or any other criteria crosses a critical value.

An alternative embodiment of DBD device 10 may have the exposed electrode partially embedded within dielectric 14, for example at location 50 indicated in dashed lines. In this alternative, the exposed electrode may lie flush with the aerodynamic surface 30 of aerodynamic structure 12. Thus, the exposed electrode, a portion of the exterior surface 36 of the dielectric and the aerodynamic surface 30 may together form a continuous aerodynamic surface. This alternative embodiment may then have no effect on the aerodynamic properties of the aerodynamic structure when the DBD device is in an unactivated state.

Still another alternative embodiment of DBD device 10 may have the exposed electrode in a hybrid or angled position where an upstream edge 52 of the exposed dielectric 14 lies embedded in dielectric 14 and flush with the surface of the aerodynamic structure while the downstream edge 28 of the exposed electrode lies above the exterior surface 36 of the dielectric 14.

Example 2

Figure 2:
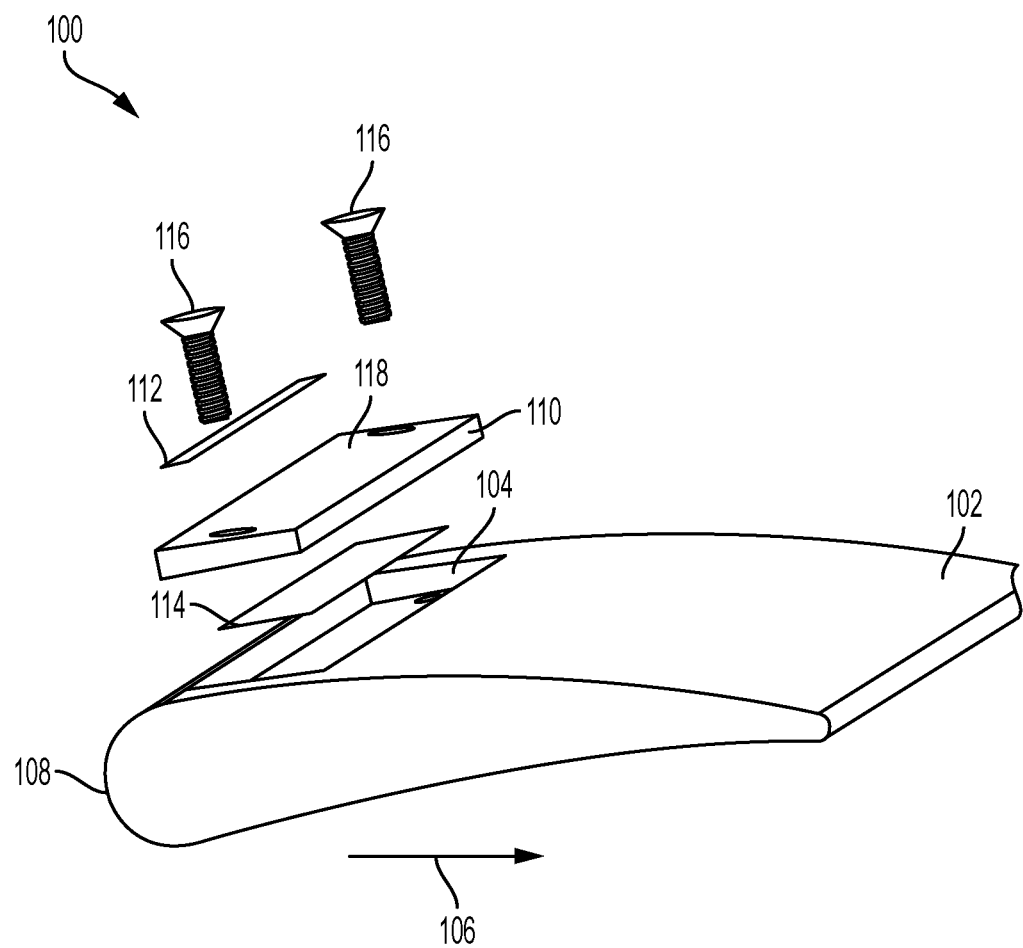
FIG. 2 is an exploded view of an embodiment of a DBD device and an aerodynamic structure, showing a recess in the structure configured to accept the DBD device.
Figure 3:
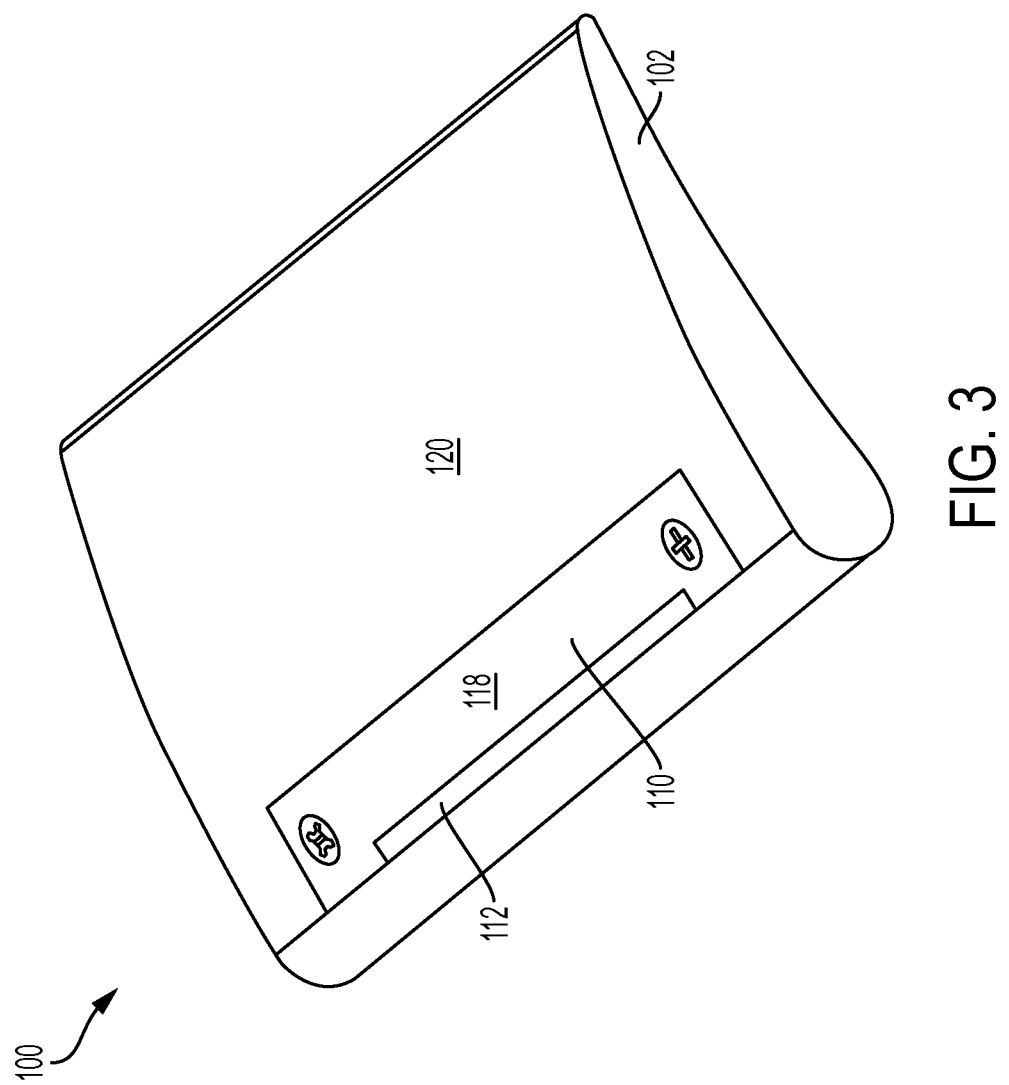
FIG. 3 is an unexploded view of the DBD device and aerodynamic structure of FIG. 2, showing the DBD device embedded within the structure.

This example describes an illustrative embodiment of a DBD device which may serve as a plasma source for active airflow control, as shown in FIGS. 2 and 3.

FIG. 2 is an exploded view of an embodiment of an exemplary DBD device, generally indicated at 100, and an aerodynamic structure 102, showing a recess 104 in the structure configured to accept the DBD device.

Aerodynamic structure 102 is shown in FIG. 2 having the shape of an airfoil. During flight operation, air may move across the aerodynamic structure generally in a direction indicated by arrow 106. Recess 104 may be located proximate a leading edge 108 of airfoil 102. Recess 104 may be sized and configured to accept the component pieces of DBD device 100.

DBD device 100 may include a rigid dielectric housing 110, an exposed electrode 112, and a buried electrode 114. DBD device 100 may be configured to be attached to airfoil structure 102 by any appropriate mechanism. It may be advantageous to operatively couple DBD device 100 to the airfoil in such a manner that the DBD device may be removed relatively easily and replaced. For example, DBD device 100 may be attached via one or more bolts 116, though other attachment mechanisms would also be possible, such as via screws, rivets, pins, or by simply snapping in place among others.

Rigid dielectric housing 110 may comprise a ceramic material. For example, housing 110 may be a machinable ceramic material such as Macor™ machinable glass-ceramic, alumina, or other types of fine grained, polycrystalline microstructure machinable ceramics. The exposed and buried electrodes may be mounted or otherwise operatively coupled to housing 110. The DBD device may be placed as a whole into recess 104 and reversibly drawn out for purposes of replacing the device should one of the components deteriorate.

Exposed electrode 112 may be joined to an exterior aerodynamic surface 118 of housing 110. The exposed electrode may be a semi-rigid member capable of maintaining a shape when not attached to housing 110 as depicted in FIG. 2. Alternately, exposed electrode 112 may be deposited on housing 110 via a deposition technique familiar to a person skilled in the art.

Buried electrode 114 may be any appropriate conductor and may be covered by the housing when DBD device 100 is disposed within recess 104. The buried electrode may be spaced from the exposed electrode in a vertical direction away from aerodynamic surface 118 and in a downwind direction 106. Buried electrode 114 may alternately be embedded in housing 110.

As with DBD device 10, DBD device 100 may include a conductive interface structure configured to electrically connect the electrodes to a voltage source configured to apply a potential difference across the exposed electrodes and the buried electrode. The interface may include a plug structure configured for connection to an AC power source. DBD device 100 may include a controller programmed to alter power supplied from the voltage source to the electrodes.

FIG. 3 is an unexploded view of DBD device 100 and aerodynamic structure 102, showing the DBD device embedded within the recess in the structure. The exterior aerodynamic surface 118 of housing 110 may be shaped to form a portion of airfoil structure 102. That is, the exposed surface 118 of the dielectric may form a smooth continuation of an aerodynamic surface 120 of the aerodynamic structure 102. Thus configured, the DBD device 100 may have a minimal impact on the flow of air over the aerodynamic structure when DBD device 100 is not in an activated state. Exposed electrode 112 may be thin, for example in a range of 0.1 to 1.0 mm. Such a thin exposed electrode may have minimal effect on the passing air when the DBD device is in an unactivated state.

Example 3

Figure 4:
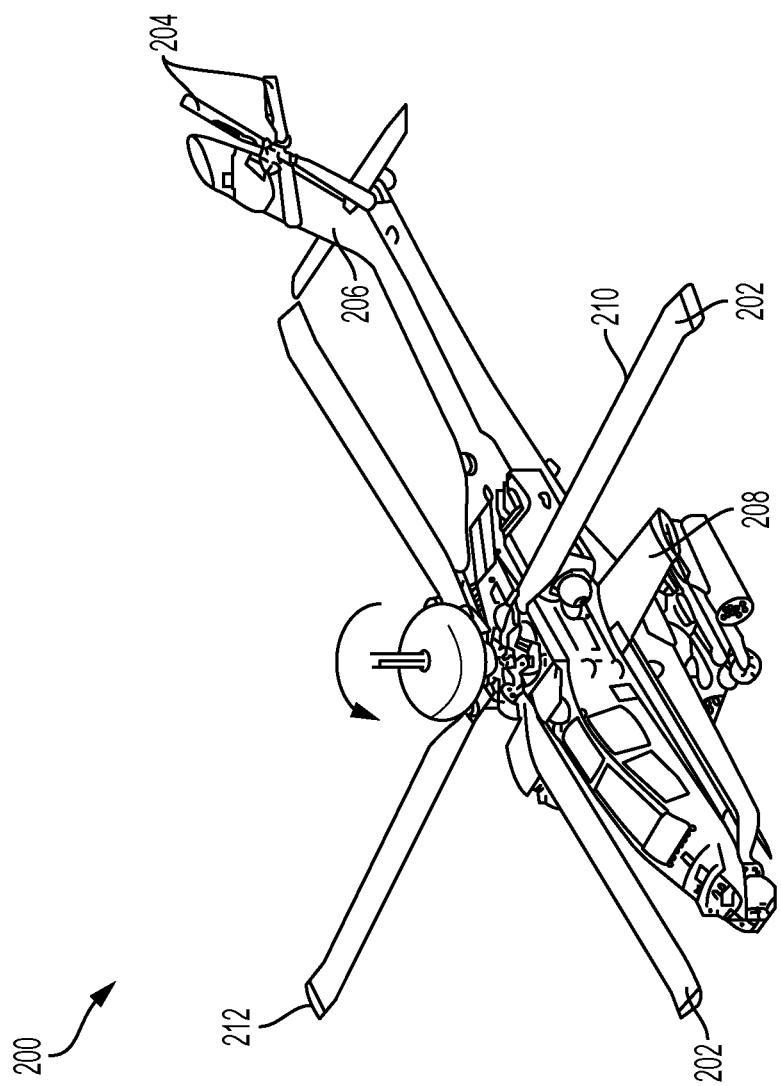
FIG. 4 is a perspective view of an aircraft, showing prospective aerodynamic surfaces in which a DBD device may be embedded.
Figure 5:
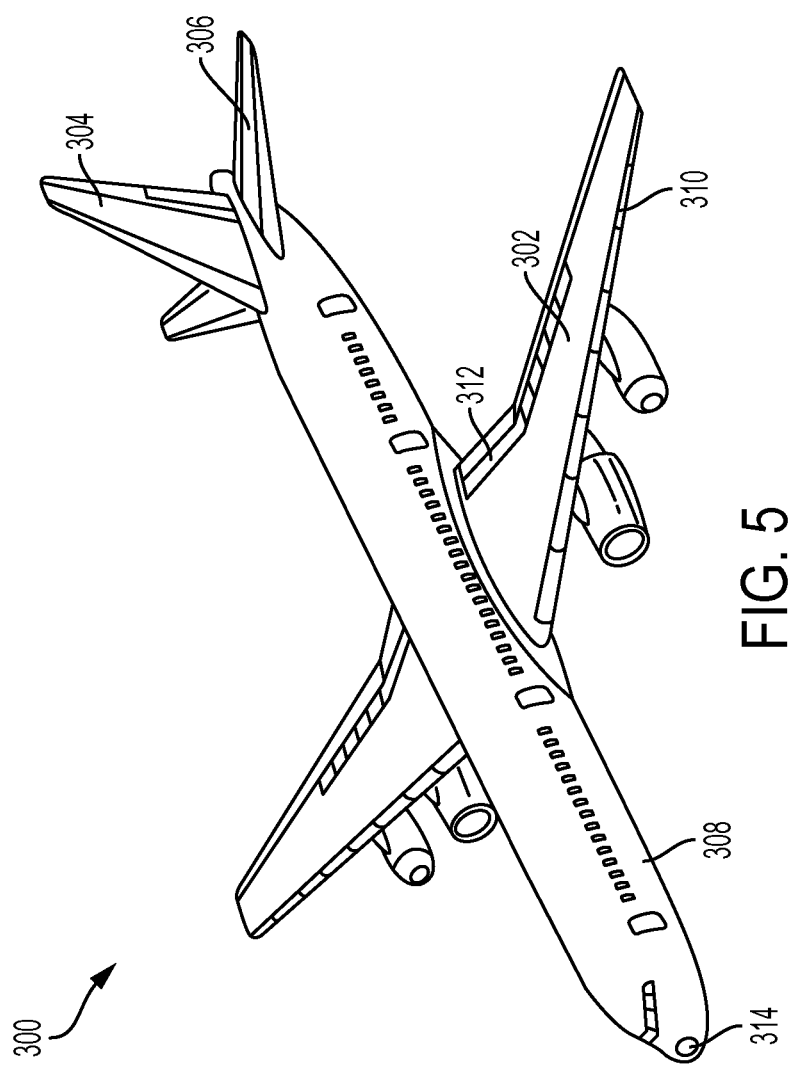
FIG. 5 is a perspective view of another aircraft, showing prospective aerodynamic surfaces in which a DBD device may be embedded.

This example describes possible installation locations for DBD devices on various exemplary aircraft, as shown in FIGS. 4 and 5.

FIG. 4 is a perspective view of an exemplary aircraft, specifically a helicopter, generally indicated at 200. Aircraft 200 may include aerodynamic structures such as, one or more main rotor blades 202, one or more tail rotor blades 204, a tail fin 206, or one or more wings 208, among others. Airflow over any one of these aerodynamic structures may be improved by an addition of an active airflow control device, such as DBD devices 10 or 100.

A DBD device may, for example, be embedded within a main rotor blade 202 proximate a leading edge 210 of the rotor blade. A DBD device such as 10 or 100 may have a length that is customized to fit the length of the aerodynamic structure in which the device may be embedded. For example, a single long DBD device may be disposed within the rotor blade 202 along most of the length of the blade. Alternately, DBD devices may have a shorter length, for example approximately 0.5 meters. Such a shorter DBD device may be installed proximate the leading edge 210 and a tip 212 of the rotor blade where the speed of the blades will be greatest. In yet another alternative, a plurality of DBD devices may be disposed in succession along the length of a rotor blade, thereby spanning most of the length of the blade with multiple shorter DBD devices. One or more DBD devices, of similar or varying lengths, may be disposed proximate aerodynamic surfaces of any of the relevant aerodynamic structures of helicopter 200. Depending on the aerodynamic properties of the relevant surfaces, it may or may not be advantageous to dispose a DBD device proximate a leading edge of the surface.

FIG. 5 is a perspective view of another exemplary aircraft, specifically an airplane, generally indicated at 300. Aircraft 300 may include aerodynamic structures such as one or more wings 302, a vertical stabilizer or tail fin 304, one or more horizontal stabilizers 306, a fuselage 308, an engine cowling, and various landing gear structures, among others. Any one of these structures may have improved airflow characteristics with the addition of one or more DBD devices, such as DBD devices 10 or 100.

As with the leading edge of rotor blade 202 on helicopter 200, one long or many short DBD devices may be embedded within wing 302 proximate a leading edge 310 of the wing. Alternately, one or more DBD devices may be embedded within wing 302 proximate one or more flaps 312. DBD devices may be disposed proximate leading edges of stabilizers 304 and 306, and proximate a leading edge 314 of fuselage 308, that is, proximate a nose of the aircraft.

In some embodiments, a DBD device may have a length of approximately 2 meters. DBD devices may require power in a range of 2-5 watts per linear foot, though other ranges are also possible. It may be advantageous to employ shorter DBD devices as they may be more modular and any single device may be configured to be embedded within more than one of the aerodynamic structures on an aircraft.

Example 4

Figure 6:
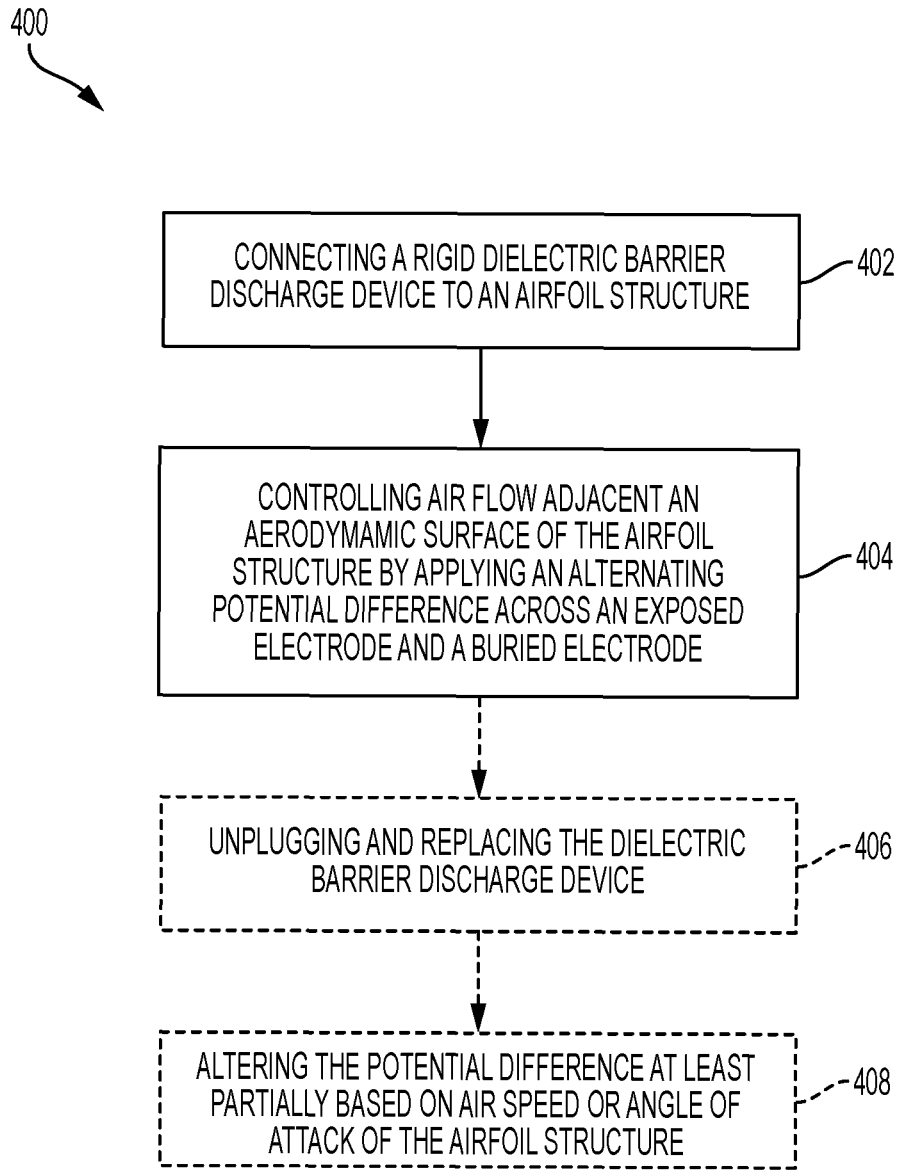
FIG. 6 is a flow chart illustrating a method of improving aerodynamic properties of an aerodynamic surface.

This example describes an illustrative method for improving aerodynamic properties of an aerodynamic surface, which may be used in conjunction with any of the apparatuses described herein, as shown in FIG. 6.

FIG. 6 depicts multiple steps of a method, generally indicated at 400, for improving aerodynamic properties of an aerodynamic surface. Method 400 may be used in conjunction with any of the DBD devices depicted in and described in reference to FIGS. 1-5. Although various steps of method 400 are described below and depicted in FIG. 6, the steps need not necessarily all be performed, and in some cases may be performed in a different order than the order shown.

Method 400 may include a step 402 of connecting a rigid dielectric barrier discharge (DBD) device to an airfoil structure. The DBD device may include a rigid dielectric carrier lying flush with an aerodynamic surface of the airfoil structure. Connecting the DBD device to the airfoil structure may include securing the DBD device within a recess in the airfoil structure. The DBD device may be secured via bolts, screws, rivets, plug structures, or any other appropriate attachment devices. The DBD device may be provided in the form of a cartridge configured to plug into the airfoil structure.

The DBD device may include a rigid dielectric carrier. For example, the dielectric 14 of DBD device 10 or the housing 110 of DBD device 100 may be considered a rigid dielectric carrier. Upon being connected to the airfoil structure, the rigid dielectric carrier may lie flush with an aerodynamic surface of the airfoil structure. When lying flush, an exposed surface of the rigid dielectric carrier may smoothly continue a portion of the aerodynamic surface which lies proximate the exposed surface of the carrier.

Method 400 may include a step 404 of controlling air flow adjacent an aerodynamic surface of the airfoil structure by applying an alternating potential difference across an exposed electrode and a buried electrode. The exposed electrode and the buried electrode may be spaced from one another across the rigid dielectric carrier. The exposed electrode may be disposed on the exposed surface of the carrier and the buried electrode may be buried beneath the carrier within the airfoil structure. The buried electrode may be disposed downwind of the exposed electrode.

The alternating potential difference applied across the electrodes may have a sinusoidally oscillating amplitude. Alternately, other waveforms such as triangular waves, sawtooth waves, or trains of pulses are also possible. The potential difference may be applied across the electrodes by connecting a voltage source to the electrodes via a conductive interface structure. This connection may be made at substantially the same time as the time when the DBD device is connected to the airfoil structure.

Applying the alternating potential difference to the electrodes may thereby create a plasma proximate an upper surface of the dielectric barrier discharge device. The plasma may be created as described in reference to DBD device 10 and FIG. 1. The upper surface of the DBD device which is proximate the plasma may be the exposed surface of the rigid dielectric carrier included in the DBD device. The plasma may be disposed over the buried electrode.

Method 400 may include an optional step 406 of unplugging and replacing the DBD device. Components of the DBD device may deteriorate with time, exposure to outside elements, and even exposure to the plasma created by the DBD device itself. It may be preferable to form the rigid dielectric carrier from a machinable ceramic in order to better withstand exposure to the plasma. In Example 2 describing DBD device 100 unplugging and replacing the DBD device may be as simple as removing a pair of bolts, removing the DBD device, plugging a new device in, and securing the new device with a pair of bolts. A technician could likely accomplish such a task in a few minutes.

Method 400 may include an optional step 408 of altering the potential difference applied across the electrodes. The potential difference may be altered by a user such as a pilot. Alternately or additionally, the potential difference may be altered at the direction of a controller device. The potential difference may be altered at a time chosen by a user or may be altered automatically when a predetermined criteria is met. For example, the potential difference may be altered, at least partially, based on an air speed of the aircraft. In another example, the potential difference may be altered, at least partially, based on an angle of attack of the airfoil structure. Improving the aerodynamic properties of the aerodynamic surface may be important when the aircraft has reached a certain speed or when the angle of attack of the airfoil structure has reached a certain value.

Example 5

This section describes additional aspects and features of embodiments, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. An aircraft active flow control dielectric barrier discharge device, comprising:
a machinable ceramic dielectric support having an aerodynamic surface shaped to form an exposed flush part of an airfoil surface on an aircraft; and
at least two electrodes configured to be oppositely charged and spaced apart from each other on the dielectric support.

A2. The aircraft active flow control dielectric barrier discharge device of A1, wherein the device is proximate a leading edge of the airfoil surface.

A3. The aircraft active flow control dielectric barrier discharge device of A1, wherein the at least two electrodes are configured to accept an alternating potential difference.

A4. The aircraft active flow control dielectric barrier discharge device of A1, wherein a first electrode of the at least two electrodes is disposed on the aerodynamic surface of the dielectric support, and a second electrode of the at least two electrodes is buried beneath the dielectric support.

A5. The aircraft active flow control dielectric barrier discharge device of A4, wherein the second electrode is disposed downwind of the first electrode.

A6. The aircraft active flow control dielectric barrier discharge device of A5, wherein the second electrode has a width of at least twice a width of the first electrode, as measured in the downwind direction.

A7. The aircraft active flow control dielectric barrier discharge device of A1, further comprising a conductive interface structure configured to electrically connect the at least two electrodes to a voltage source configured to apply a potential difference across two of the at least two electrodes.

A8. The aircraft active flow control dielectric barrier discharge device of A7, wherein the conductive interface structure includes a plug structure configured for connection to an AC power source.

A9. The aircraft active flow control dielectric barrier discharge device of A8, further comprising a controller programmed to alter power supplied from the source to the electrodes based on an aircraft speed threshold.

A10. The aircraft active flow control dielectric barrier discharge device of A1, further comprising a controller programmed to alter power supplied from the source to the electrodes based on an angle of attack trajectory threshold.

A11. The aircraft active flow control dielectric barrier discharge device of A1, wherein the aerodynamic surface forms an external surface of an aircraft wing.

A12. The aircraft active flow control dielectric barrier discharge device of A1, wherein the aerodynamic surface forms an external surface of an aircraft tail fin.

A13. The aircraft active flow control dielectric barrier discharge device of A1, wherein the aerodynamic surface forms an external surface of an aircraft nose.

A14. The aircraft active flow control dielectric barrier discharge device of A1, wherein the aerodynamic surface forms an external surface of an aircraft rotor blade.

B1. A dielectric barrier discharge device, comprising:
a rigid dielectric housing having an exterior aerodynamic surface shaped to form a portion of an airfoil structure on an aircraft;
an exposed electrode joined to the exterior aerodynamic surface of the housing;
a buried electrode covered by the housing, spaced from the exposed electrode; and
a conductive interface structure configured to electrically connect the electrodes to a voltage source configured to apply a potential difference across the exposed electrode and the buried electrode.

B2. The dielectric barrier discharge device of B1, wherein the dielectric housing comprises a ceramic material.

B3. The dielectric barrier discharge device of B1, wherein the buried electrode is embedded in the housing.

B4. The dielectric barrier discharge device of B1, wherein the conductive interface structure includes a plug structure configured for connection to an AC power source.

B5. The dielectric barrier discharge device of B1, further comprising a controller programmed to alter voltage supplied from the source to the electrodes.

C1. A method to improve aerodynamic properties of an aerodynamic surface, the method comprising:

connecting a rigid dielectric barrier discharge device to an airfoil structure, the dielectric barrier discharge device including a rigid dielectric carrier lying flush with an aerodynamic surface of the airfoil structure; and controlling air flow adjacent the aerodynamic surface of the airfoil structure by applying an alternating potential difference across an exposed electrode and a buried electrode, thereby creating a plasma proximate an upper surface of the dielectric barrier discharge device.

C2. The method of C1, wherein the buried electrode is disposed downwind of the exposed electrode.

C3. The method of C1, wherein the plasma is created over the buried electrode.

C4. The method of C1, wherein the applying step includes electrically connecting a voltage source to the electrodes via a conductive interface structure.

C5. The method of C1, further comprising unplugging and replacing the dielectric barrier discharge device.

C6. The method of C1, wherein the dielectric barrier discharge device is provided in the form of a cartridge configured to plug into the airfoil structure.

C7. The method of C1, further comprising altering the potential difference at least partially based on air speed.

C8. The method of C1, further comprising altering the potential difference at least partially based on an angle of attack of the airfoil structure.

ADVANTAGES, FEATURES, BENEFITS

The different embodiments of the dielectric barrier discharge devices (DBD) described herein provide several advantages over known solutions for providing air flow control using plasma sources. For example, the illustrative embodiments of DBD devices described herein allow the DBD device to be embedded within an aerodynamic structure. Additionally, and among other benefits, illustrative embodiments of the DBD devices described herein allow the DBD devices to be formed into an easily replaceable part. No known system or device can perform these functions, particularly outside of a laboratory setting. Thus, the illustrative embodiments described herein are particularly useful for providing active air flow control for in service aircraft. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

I claim:

1. An aircraft active flow control dielectric barrier discharge device, comprising:
   a machinable ceramic dielectric support having an aerodynamic surface shaped to form an exposed flush part of an airfoil surface on an aircraft; and
   at least two electrodes configured to be oppositely charged and spaced apart from each other on the dielectric support wherein the dielectric support includes a housing in the form of a cartridge having a conductive plug structure configured to be plugged into the airfoil structure and unplugged for replacement,
   wherein a first electrode of the at least two electrodes is disposed on the aerodynamic surface of the dielectric support, and a second electrode of the at least two electrodes is buried beneath the dielectric support.

2. The aircraft active flow control dielectric barrier discharge device of claim 1, wherein the device is at a leading edge of the airfoil surface.

3. The aircraft active flow control dielectric barrier discharge device of claim 1, wherein the second electrode is disposed downwind of the first electrode.

4. The aircraft active flow control dielectric barrier discharge device of claim 3, wherein the second electrode has a width of at least twice a width of the first electrode, as measured in the downwind direction.

5. The aircraft active flow control dielectric barrier discharge device of claim 1, wherein the conductive plug structure is configured to electrically connect the at least two electrodes to a voltage source configured to apply a potential difference across two of the at least two electrodes.

6. The aircraft active flow control dielectric barrier discharge device of claim 5, wherein the conductive plug structure is configured for connection to an AC power source.

7. The aircraft active flow control dielectric barrier discharge device of claim 6, further comprising:
   a controller programmed to alter power supplied from the AC power source to the electrodes based at least partially on an aircraft speed.

8. The aircraft active flow control dielectric barrier discharge device of claim 6, further comprising:
   a controller programmed to alter power supplied from the AC power source to the electrodes based at least partially on an angle of attack trajectory.

9. The aircraft active flow control dielectric barrier discharge device of claim 1, wherein the aerodynamic surface forms an external surface of at least an aircraft wing, an aircraft nose, and an aircraft rotor blade.

10. The device of claim 1, wherein the first electrode is flush with the aerodynamic surface.

11. The device of claim 1, wherein the cartridge is configured for connection to the airfoil surface via one or more bolts.

12. The device of claim 1, wherein the cartridge is configured to snap into flush engagement with the airfoil surface.

13. A method to improve aerodynamic properties of an aerodynamic surface, the method comprising:

connecting a rigid dielectric barrier discharge device to an airfoil structure, the dielectric barrier discharge device including a rigid dielectric carrier lying flush with an aerodynamic surface of the airfoil structure;

controlling air flow adjacent the aerodynamic surface of the airfoil structure by applying an alternating potential difference across an exposed electrode and a buried electrode of the dielectric barrier discharge device, thereby creating a plasma at an upper surface of the dielectric barrier discharge device; and unplugging and replacing the dielectric barrier discharge device by unplugging a plug structure of the dielectric barrier discharge device from the airfoil structure.

14. The method of claim 13, wherein the buried electrode is disposed downwind of the exposed electrode.

15. The method of claim 13, wherein the plasma is created over the buried electrode.

16. The method of claim 13, wherein the dielectric barrier discharge device is provided in the form of a cartridge configured to plug into the airfoil structure.

17. The method of claim 13, further comprising:
altering the potential difference at least partially based on air speed or an angle of attack of the airfoil structure.

\* \* \* \* \*